United States Patent [19]
Navarro

[11] Patent Number: 5,874,822
[45] Date of Patent: Feb. 23, 1999

[54] HIGH AMPERAGE STATOR FOR CHARGING SYSTEMS IN PARALLEL

[76] Inventor: Jesus N. Navarro, 1711 Loma Dr., Montebello, Calif. 90640

[21] Appl. No.: 246,771

[22] Filed: May 20, 1994

[51] Int. Cl.[6] .................................................. H01M 10/46
[52] U.S. Cl. ............................................ 320/107; 310/198
[58] Field of Search ................................. 320/15, 16, 17, 320/61, 64, 65, 72, 107, DIG. 28, DIG. 31; 310/198, 254; 322/90, 28

[56] References Cited

U.S. PATENT DOCUMENTS

| | | | |
|---|---|---|---|
| 3,793,544 | 2/1974 | Baumgartner | 320/17 |
| 3,809,995 | 5/1974 | Hardin | 320/17 X |
| 4,045,718 | 8/1977 | Gray | 320/17 |
| 4,117,390 | 9/1978 | Iwata | 322/90 |
| 4,260,925 | 4/1981 | Barrett | 310/216 |
| 4,354,127 | 10/1982 | Stroud | 310/198 |
| 4,914,335 | 4/1990 | Horton et al. | 310/198 X |
| 5,006,745 | 4/1991 | Nishio et al. | 310/198 X |
| 5,072,129 | 12/1991 | Sugiyama | 310/198 X |
| 5,122,705 | 6/1992 | Kasase et al. | 310/198 X |
| 5,296,778 | 3/1994 | Stroud | 310/68 D |
| 5,424,599 | 6/1995 | Stroud | 310/198 |
| 5,519,271 | 5/1996 | Sakashita et al. | 310/254 X |

*Primary Examiner*—Edward Tso
*Attorney, Agent, or Firm*—Lyon & Lyon LLP

[57] ABSTRACT

A high amperage stator having a plurality of stator windings which are superimposed over each other around a stator body to make a single electrical unit is provided for charging multiple systems in parallel or in series. Each of the stator windings of a high amperage stator are comprised of two coils having four turns per coil. The high amperage stator can replace the conventional stator on a typical automotive alternator to allow multiple batteries to be charged, in parallel or in series, without affecting efficiency, demonstrating that its capacity is equivalent to that of several alternators using conventional stators.

18 Claims, 4 Drawing Sheets

Each Line Represents
The Coil Wind 4 Times

HIGH AMPERAGE STATOR FOR CHARGING SYSTEMS IN PARALLEL This stator (The invention) has a wide range of uses in systems that require high amperage, specifically for those systems were a great amount of amperage and voltage is necessary.

CROSS REFERENCE

A stator in a normally fabricated alternator is 70 Amps maximum to charge one battery. To charge two batteries (this would be 24 Volts) you need to use a regulator of 24 Volts; To charge 36 Volts (Normally available as original equipment manufacturing O.E.M.) you need to use a regulator of 36 Volts. I have proven with this High amperage Stator you obtain ample advantages: it can charge from 12 volts to an average of 70 regulated Volts, by regulating the 12 volt's regulator to 14.2 Volts per battery. This means that an Alternator using a High amperage stator (The invention) can charge from one to five batteries, demonstrating that its capacity is equivalent to five alternators using normal stators. Another particularity is that it is able to charge five batteries in parallel or in series without affecting its efficiency.

SUMMARY

The high amperage stator has been tried in Ford alternators of 100 Amps and in others like the medium sized Delco alternator.

As an example we can cite the following:

A CB radio of 2000 to 3000 watts of power that has a consumption of 300 Amps. requires five alternators using normal stator of 60 Amps (O.E.M.) or two Delco alternators of 160 Amps. to charge five batteries in parallel to work normally. With this type of high amperage stator (The invention) you eliminate the five alternators using normal stator or the two Delco alternators. Installing this alternator with high amperage stator that produced direct current it can charge from one to up to five batteries in parallel with the option of charging them in series, one, two, three, four or five batteries functioning normally in each case.

The capacity of the high amperage stator: at 800 RPM, the voltage sustained at 14.2 Volts produces 35 Amps per battery and at 1200 RPM its normal capacity at 14.2 Volts produces from 45 to 50 Amps per battery.

DRAWINGS DESCRIPTIONS

The drawings are made of 4 sheets with 5 figures as follows:

FIG. 1 Vertical View.—Shows the structure of the high amperage stator formed by the five different coils and shows the inputs and outputs.

FIG. 1A Sectional View with Five Coils.—Shows the sections of the high amperage stator formed by the five superimposed coils (one over the other).

FIG. 2 Vertical View with Output Connection to Diode Plates.—Shows the structure of the high amperage stator and the way that the outputs connect to the diode plates.

FIG. 3 Vertical View with Output Connection to Diode Plates & Batteries.—Shows the structure of the high amperage stator, the outputs connections to the diode plates, and the diode plates connection to the batteries.

FIG. 4 Back View of the Finished Assembly in an Alternator Housing.—This is a view of a finished alternator with the final structure of the outputs of the high amperage stator connected to the housing assay of an alternator in the proper manner. At the same time it structurally shows the connections of the alternator to the diode plates and of the latest to the batteries.

DETAILED DESCRIPTION

Figure 1:
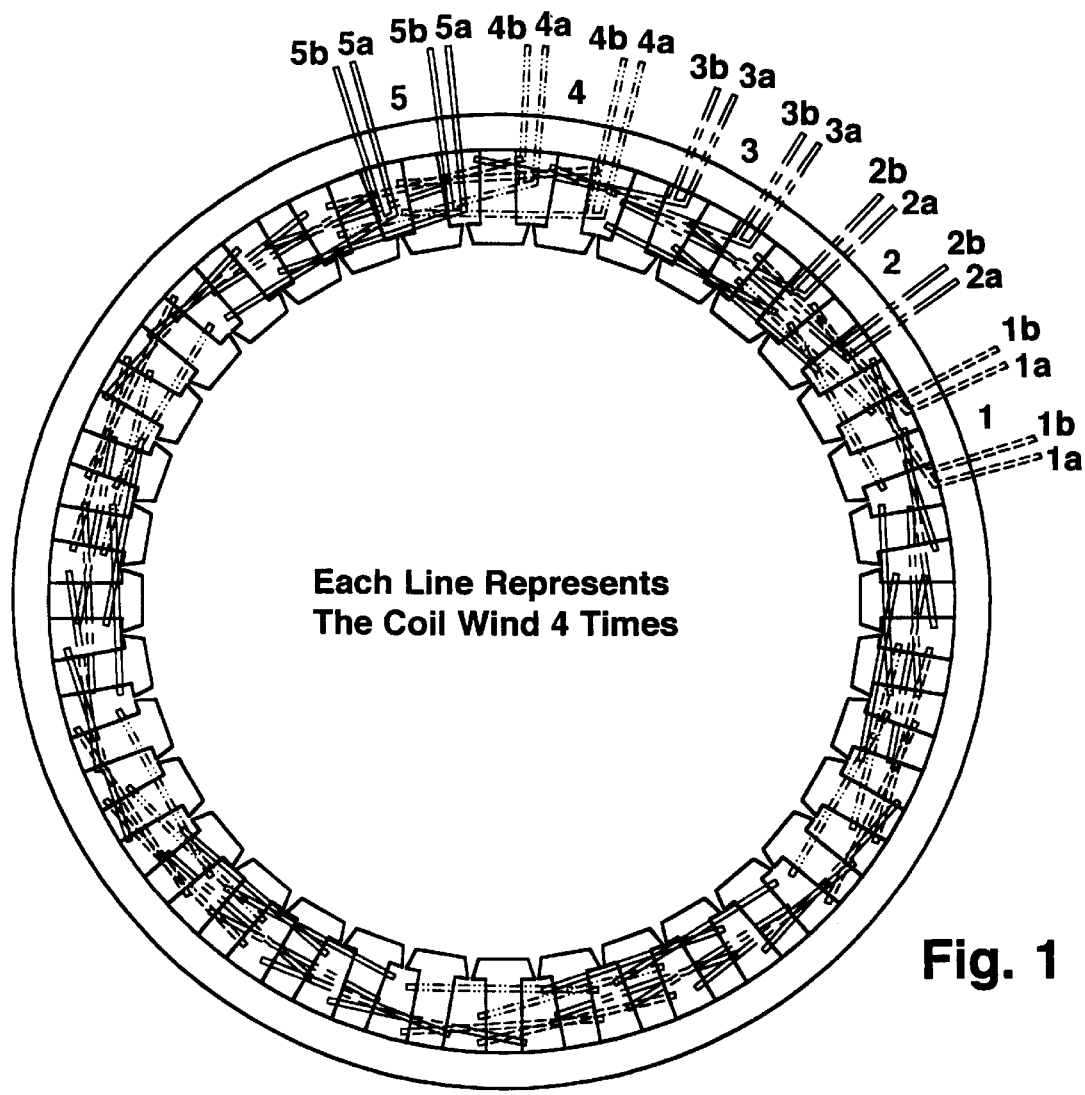
Figure 1A:
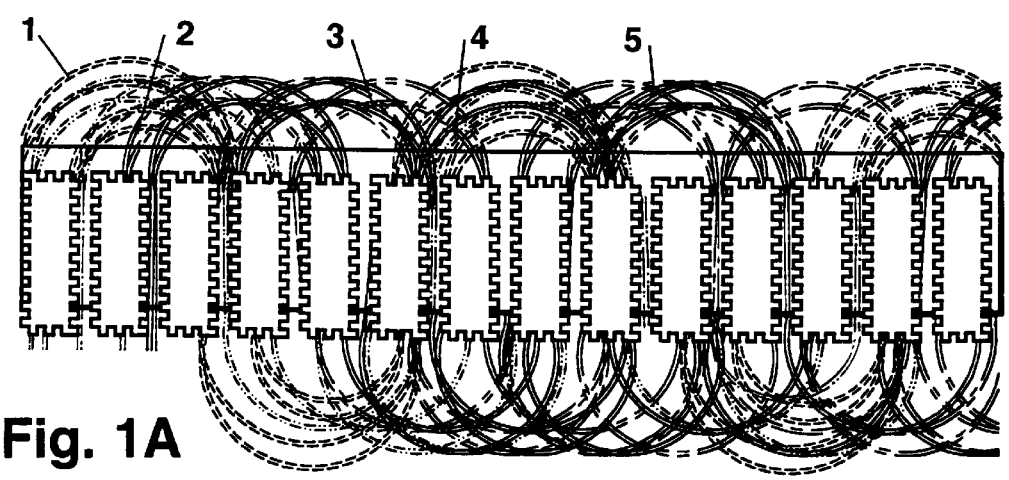

The functioning and structure of this alternator with high amperage stator are the following:

Five stators make this high amperage stator. Each stator is composed of two coils of four turns each coil, with two outputs and two inputs per stator, this is for each two coils. The free outputs and the inputs are connected in series for each stator. The five stators are superimposed, this is one over the other up to five complete stators, this conglomerate forming one high amperage stator (The invention). For the fabrication of this high amperage stator use 14 gage, 15 gage, 16 gage and 17 gage wire in the order that the following relation demonstrates in FIG. 1 & 1A.

| Coil | Wire | # of turns | Free outputs | Interconnected inputs |
|---|---|---|---|---|
| 1. 1st Coil | 14 gage | 4 turns | $1^a$ | $1^c$ |
| 2. 2nd Coil | 15 gage | 4 turns | $2^a$ | $2^c$ |
| 3. 3rd Coil | 17 gage | 4 turns | $3^a$ | $3^c$ |
| 4. 4th Coil | 16 gage | 4 turns | $4^a$ | $4^c$ |
| 5. 5th Coil | 16 gage | 4 turns | $5^a$ | $5^c$ |

Stator Connection

Figure 2:
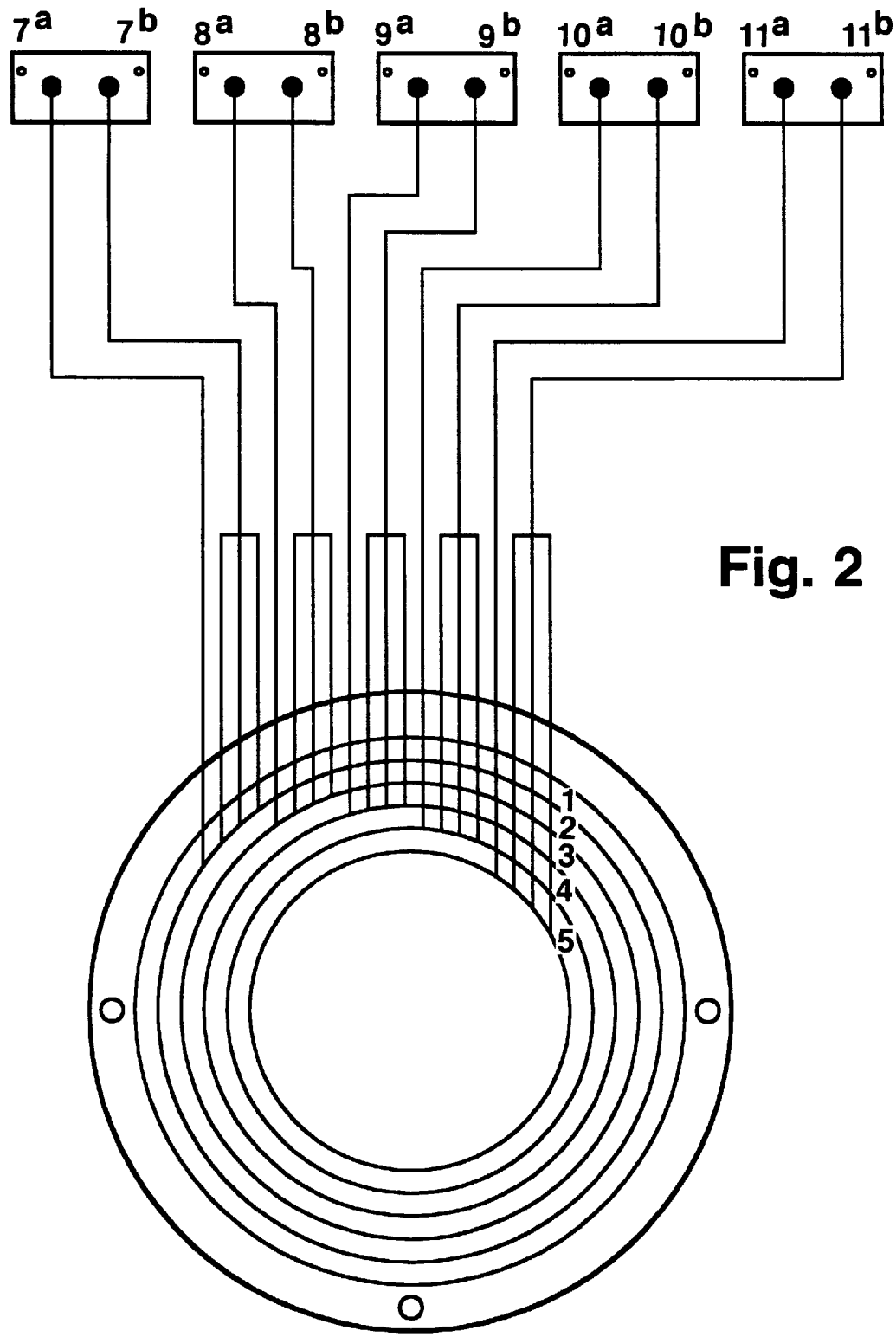
Figure 3:
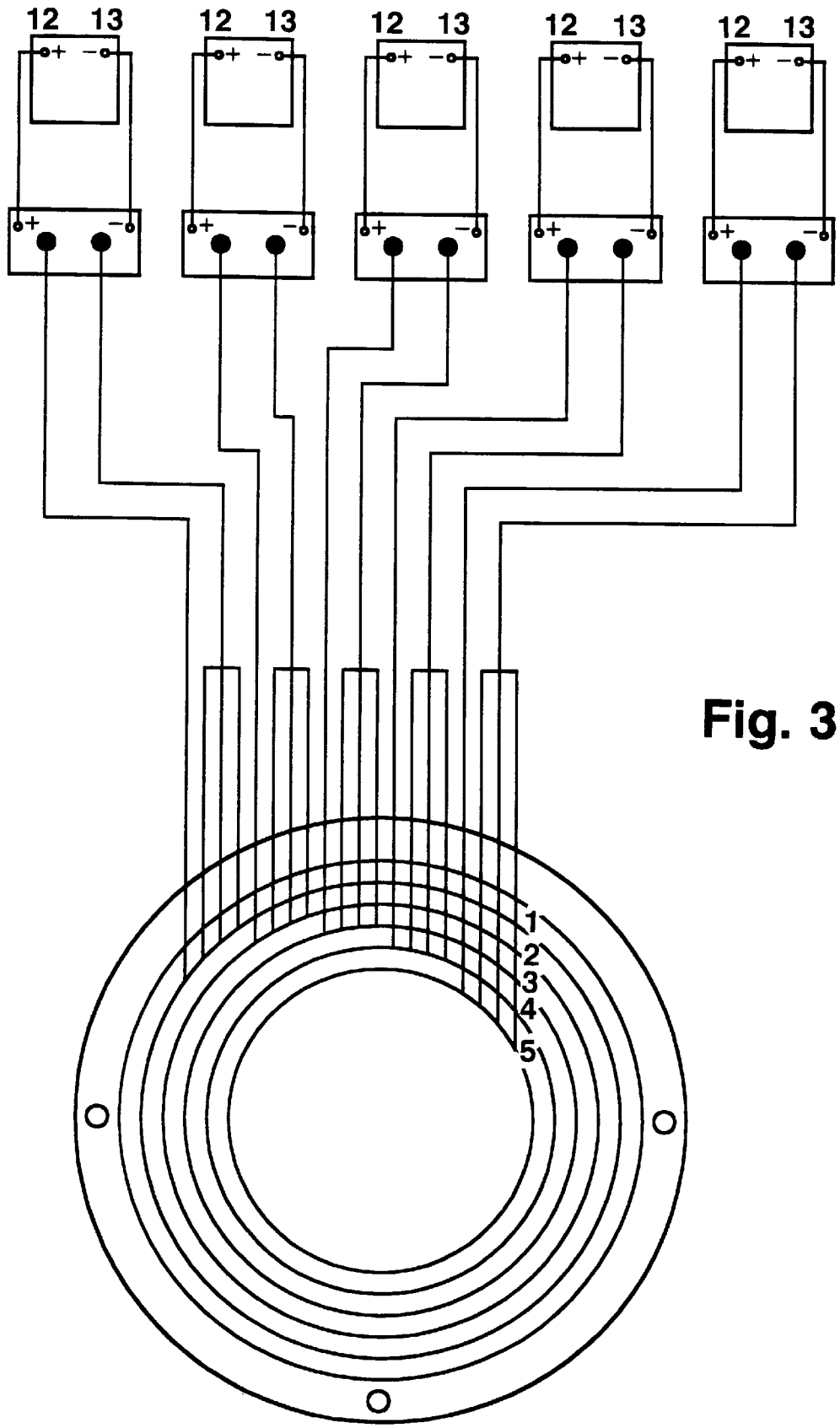

The two outputs of each stator (ten per high amperage stator) are connected separately in each diode plate (one plate per 2 outputs) as shown in FIG. 2. This way we have 10 ends that come out of the high amperage stator: $1^a, 2^a, 3^a, 4^a, 5^a$, that connect in pairs (two and two) to the diode plate separately. This is each stator to each diode plate: $7^a7^b, 8^a8^b, 9^a9^b, 10^a10^b, 11^a11^b$, forminig this way the five stators in one. FIG. 3 demonstrates that each diode plate then has positive outputs (+), $7^a, 8^a, 9^a, 10^a, 11^a$ and negative (−), $7^b, 8^b, 9^b, 10^b, 11^b$ in this order for each diode plate battery $\overset{+}{12}$ and $\overset{-}{13}$ leaving connected the positive from the diode plate with the positive from the battery and the negative from the diode plate to the negative of the battery in each separate diode plate.

Figure 4:
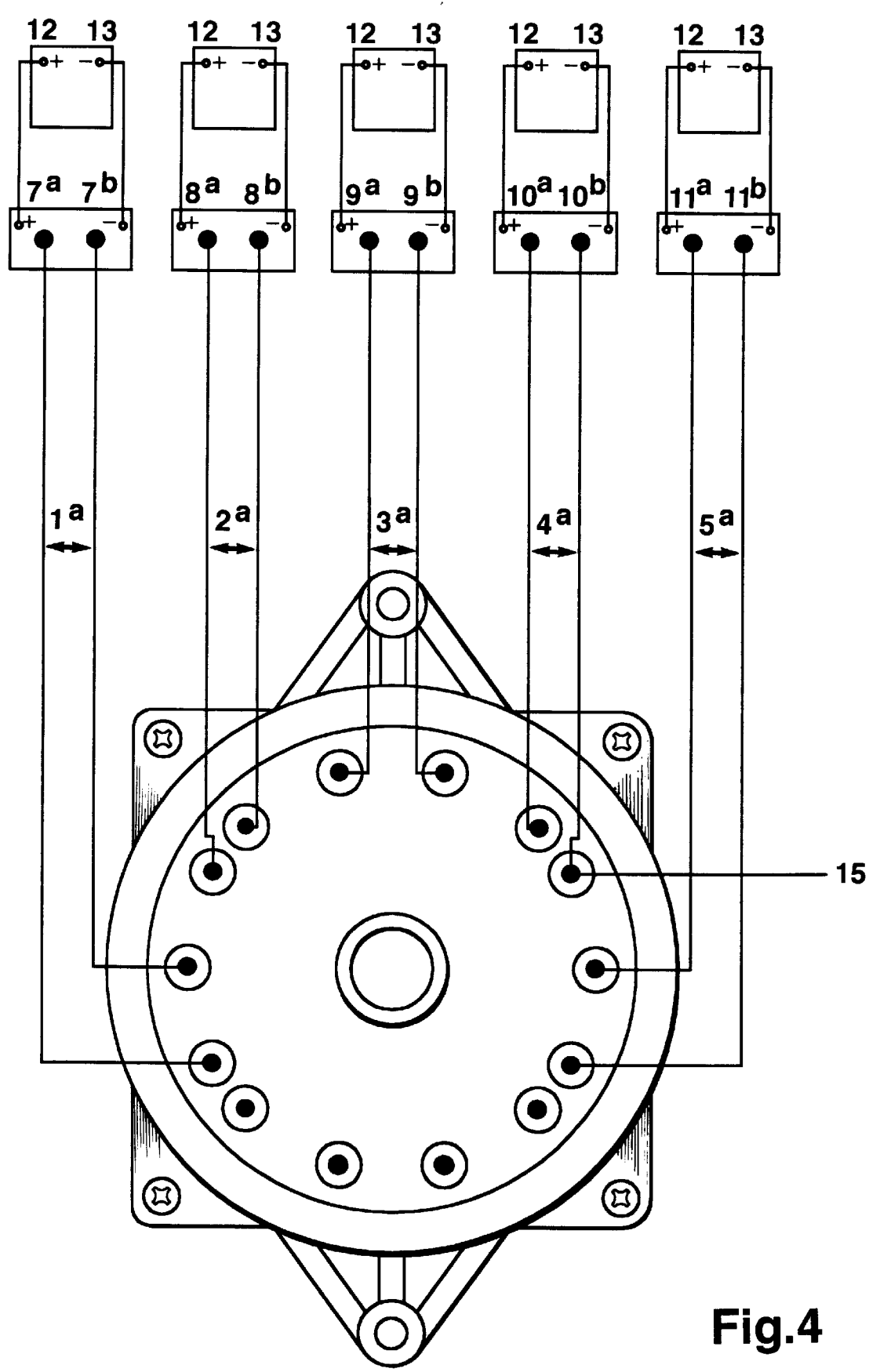

| Finished alternator FIG. 4 | Item 14 alternator housing |
|---|---|
| | Item 15 bolts |

I claim:

1. A high output stator comprising:
   (a) a stator body; and
   (b) a plurality of separate stator windings superimposed over each other around said stator body, each of said plurality of electrically separate stator windings having a plurality of coils, each of said plurality of coils having one or more turns around said stator body, and each of said plurality of coils having an input and an output, wherein said inputs from said plurality of coils are connected together within each separate stator winding.

2. The high output stator of claim 1, having four separate stator windings.

3. The high output stator of claim 2, wherein each stator winding has two coils.

4. The high output stator of claim 2, wherein each stator winding has three coils.

5. The high output stator of claim 1, having five separate stator windings.

6. The high output stator of claim 5, wherein each stator winding has two coils.

7. The high output stator of claim 5, wherein each stator winding has three coils.

8. The high output stator of claim 5, wherein the separate stator windings are made from a 14 gage wire, a 15 gage wire, a 17 gage wire, a 16 gage wire, and a 16 gage wire, respectively.

9. A high output alternator, comprising:

(a) an alternator housing;

(b) a high amperage stator mounted within said alternator housing and having a stator body and a plurality of separate stator windings superimposed over each other around the stator body, each of said plurality of electrically separate stator windings having a plurality of coils, each of said plurality of coils having one or more turns around said stator body, and each of said plurality of coils having an input and an output, wherein said inputs are connected together within each separate stator winding and said outputs are connected to a diode plate connected to said alternator housing; and (c) a rotor mounted within the stator body.

10. The high output alternator of claim 9, wherein the high amperage stator has four separate stator windings.

11. The high output alternator of claim 10, wherein each stator winding has two coils.

12. The high output alternator of claim 10, wherein each stator winding has three coils.

13. The high output alternator of claim 9, wherein the high amperage stator has five separate stator windings.

14. The high output alternator of claim 13, wherein each stator winding has two coils.

15. The high output alternator of claim 13, wherein each stator winding has three coils.

16. The high output alternator of claim 13, wherein said separate stator windings are made from a 14 gage wire, a 15 gage wire, a 17 gage wire, a 16 gage wire, and a 16 gage wire, respectively.

17. A high output alternator, comprising:

(a) an alternator housing;

(b) a high amperage stator mounted within said alternator housing and having a stator body and a five separate stator windings superimposed over each other around the stator body, each of said plurality of electrically separate stator windings having a two coils, each of said coils having four turns around said stator body, and each of said coils having an input and an output, wherein said inputs are connected together within each separate stator winding and said outputs are connected to a diode plate connected to said alternator housing; and (c) a rotor mounted within the stator body.

18. The high output alternator of claim 17, wherein said separate stator windings are made from a 14 gage wire, a 15 gage wire, a 17 gage wire, a 16 gage wire, and a 16 gage wire, respectively.

* * * * *